Jan. 12, 1943.  P. L. POLAND  2,308,206
LEVELING INSTRUMENT
Filed April 7, 1941   3 Sheets-Sheet 1
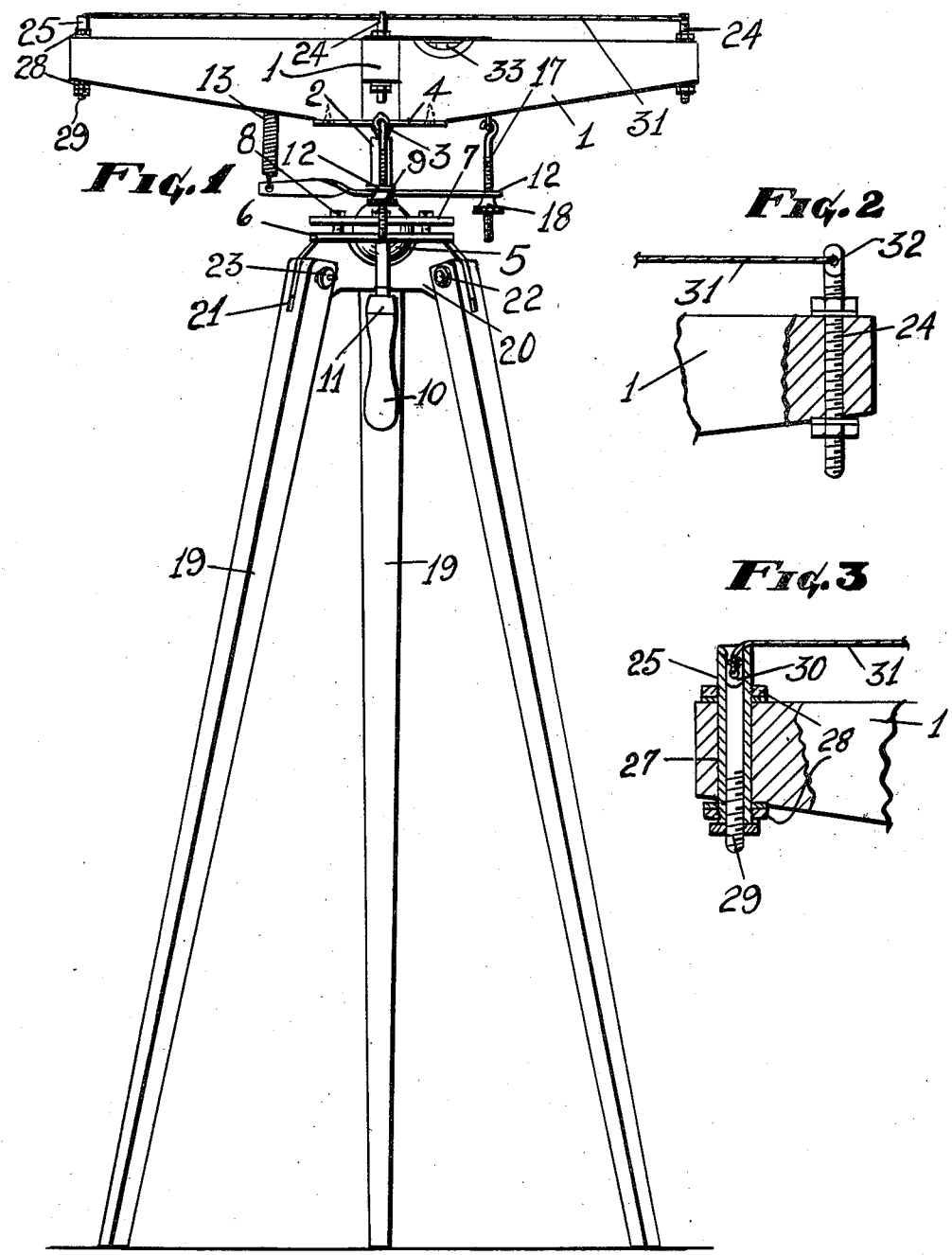
INVENTOR.
PINKNEY L. POLAND
BY U.G. Charles
atty.

Jan. 12, 1943.  P. L. POLAND  2,308,206
LEVELING INSTRUMENT
Filed April 7, 1941   3 Sheets-Sheet 2
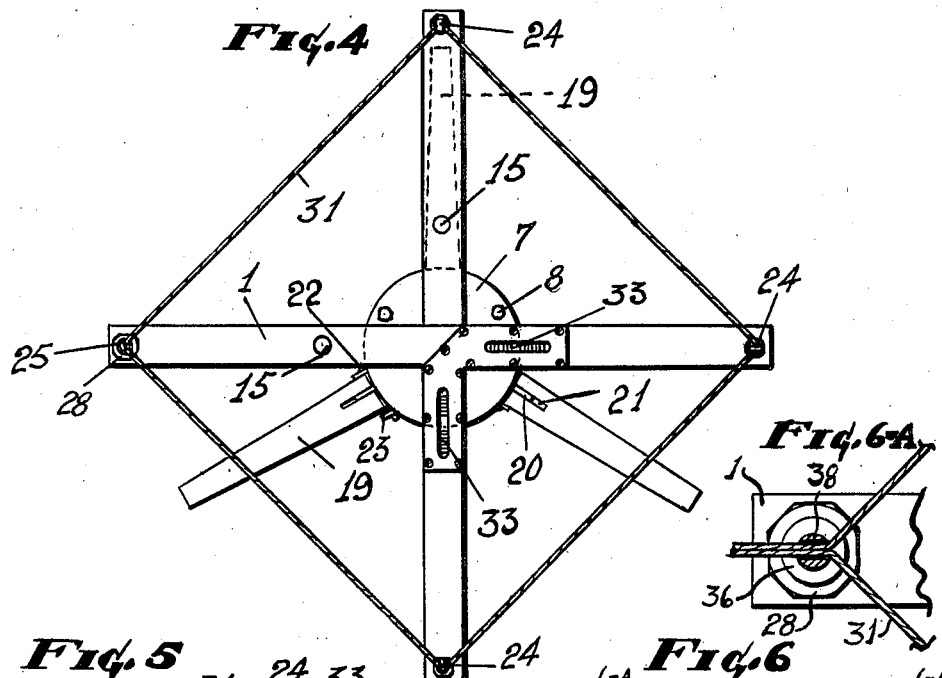
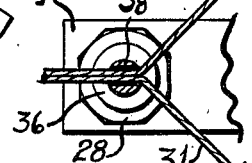
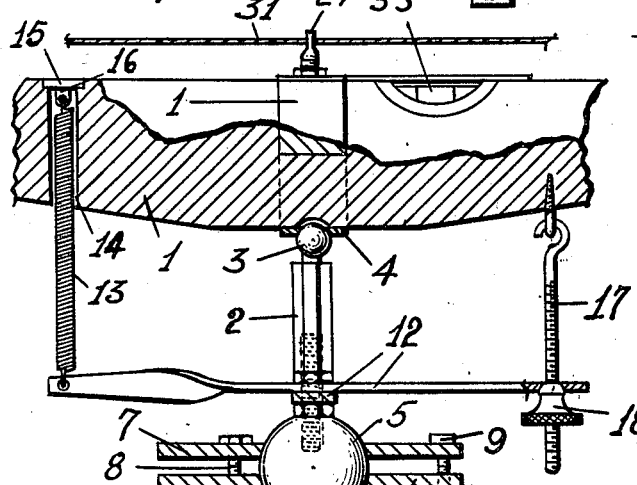
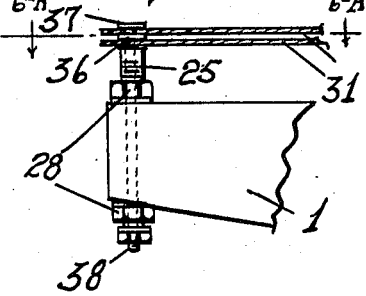
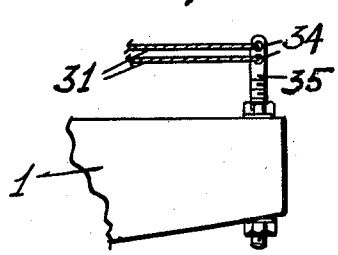
INVENTOR.
PINKNEY L. POLAND
BY U. G. Charles
Atty.

Jan. 12, 1943.   P. L. POLAND   2,308,206
LEVELING INSTRUMENT
Filed April 7, 1941   3 Sheets-Sheet 3
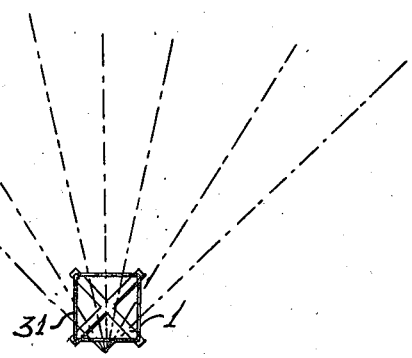
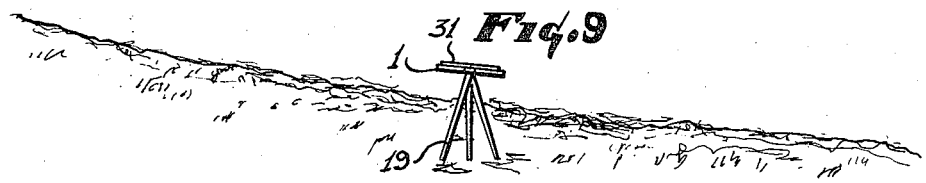
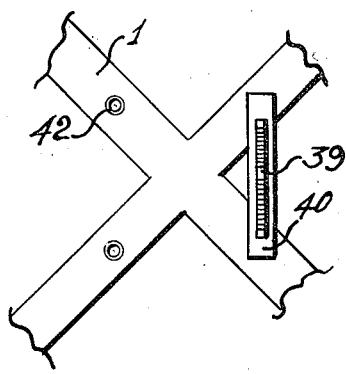
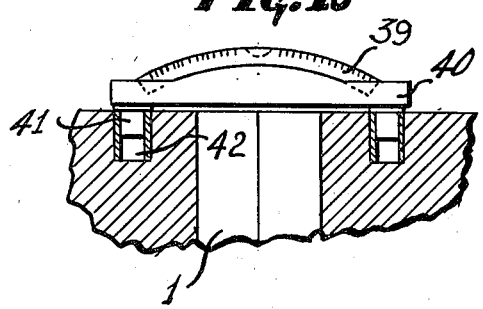
INVENTOR.
PINKNEY L. POLAND
BY E. Y. Charles
Atty.

Patented Jan. 12, 1943

2,308,206

UNITED STATES PATENT OFFICE 2,308,206

LEVELING INSTRUMENT

Pinkney L. Poland, Isabel, Kans.

Application April 7, 1941, Serial No. 387,235

3 Claims. (Cl. 33—73)

My invention herein disclosed relates to a leveling instrument, and has for its principal object a wide scope of visibility, and sight lines to detect configuration of ground surface.

A further object of my invention is to provide an instrument having spirit levels for accurate setting of horizontally disposed lines carried by the head of the instrument, and furthermore an arcuate spirit level having the usual bubble to circumscribe the arc when the level is rocked on its axis, the upper or outer portion of the level having graduation degree marks extending each way from the center of the arc that is defined by the character zero.

A still further object of my invention is to provide straight spirit levels having graduation marks spaced each way from the center of the head to determine the degree of the slant of the instrument head.

A still further object of my invention is to provide an instrument provided with a head to carry a single or pair of lines positioned rectangular in form whereby sighting across the lines may be accomplished from either side of the form to determine the slope of land in all directions from the instrument.

A still further object of my invention is to construct an inexpensive instrument that is easily understood and operated.

These and other objects will hereinafter be more fully explained, reference being had to the accompanying drawings, forming a part of this specification, and in which like characters will apply to like parts in the different views.

Referring to the drawings:

Fig. 1 is an elevation of the instrument.

Fig. 2 is an enlarged view of one of the line posts and method of connecting the same at its respective end of the arm of the head.

Fig. 3 is an enlarged view of the datum line post, adjustably arranged with respect of spacing the line toward and from the arm, and illustrating the tensioning means for the line.

Fig. 4 is a plan view of the head of the instrument.

Fig. 5 is an enlarged fragmentary side view of the head and tripod connection, parts removed for convenience of illustration.

Fig. 6 is a modification for a datum post to carry a pair of lines in parallelism.

Fig. 6—A is an enlarged sectional view taken on line 6A—6A in Fig. 6.

Fig. 7 is a modification for the other posts to carry the pair of lines.

Fig. 8 is a diagrammatical plan view to illustrate the scope of vision above the head of the instrument.

Fig. 9 is an elevation of the instrument applied to a sloping contour of a field.

Fig. 10 is an enlarged side view of an arcuate spirit level and seating means therefor on the arms of the head.

Fig. 11 is an enlarged plan view showing one position of the arcuate level as carried by two of the arms, selectively.

The invention herein disclosed consists of a plurality of radially disposed arms 1, functioning as the head of the instrument, that is mounted on a center post 2, having a ball 3 on the upper end thereof to seat in a socket 4 secured to the axial center of the head structure, and a ball 5 on the lower end of the center post to seat in an aperture in a lower circular plate 6, and another like apertured plate 7 upwardly positioned to seat on the ball, the apertures in each plate being of lesser diameter than that of the ball as binding means therefor when clamped together to position the center post vertically, or at a desired angle when the plates are tensioned together by bolts 8, and a bolt 9, last said bolt having a handle 10 downwardly extending as a means to tighten said bolt that threadedly engages in the shank 11 of the handle as shown by dotted lines, whereby the plates are clamped together or released. It will now be seen that a major rocking movement of the head will occur at the lower ball 5 of the center post, and a final adjustment by the rocking movement on the upper ball by means as follows:

Secured to the center post in close proximity to the lower ball is a pair of bars 12 transversely crossing each other, and being aligned outward with their respective arms of the head. One end of each bar is attached to its respective arm by a coil spring 13, one end of which is attached to the bar while the upper end portion of the spring extends through a bore 14 in the arm and having a plate 15 to seat over the upper end of the bore integrally joined, and depending from the plate is an apertured ear 16, centrally positioned and to which the upper end of the spring is attached; being so arranged and extending through the arms is means to provide ample length for the spring for the flexible resilience required to rock the arms of the head, and secure the same stationarily by the assistance of a bolt element 17 secured to the other end of each of said bars, each bolt having a hook and eye at the underside of their respective arms, while the other end portion extends through an aperture positioned in the bar, the bolts being threaded and having a knurled nut 18 to engage on the underside of the bar as tensioning means against the tension of the spring.

The head structure and component parts thereof are carried on a tripod consisting of legs 19 rockably secured to radially extending ears 20 that are integrally secured to the under side of said plate 6 and equally spaced therearound, the upper end of each leg having a slot 21 extending therethrough to straddle their respective ears to which they are clamped by a bolt 22 extending through the apertures, said ears and split portion of the legs, the bolt being tensioned by a knurled nut 23 threadedly engaging on one end thereof, while the other end has a head to seat on the other side of the leg.

Adjacent the outer end of each arm, transversely passing therethrough and upwardly extending therefrom are line carrying posts 24, and a post structure comprised of a hollow sleeve 25 to slideably engage in the bore 27 of its respective arm, the sleeve being threaded at its upper and lower end portions to threadedly engage nuts 28 to secure the sleeve at its desired extension upward, the hollow of the sleeve at its upper extremity being bell mouthed for the purpose later described.

Slideably engaging in the sleeve is an anchor rod 29 having an eye 30 at the upper end thereof, the lower end portion of the rod being threaded and having a nut to threadedly engage thereon to move the rod downward as tensioning means for a line 31 slideably engaging over the bell mouth end of the sleeve to avoid cutting the line, the line being secured to the eye of the rod and drawn downward to stretch the line as anchored by their respective posts 24 passing through apertures 32 adjacent the top of said posts, and the said posts 24 each having a nut to threadedly engage above and below the arm to adjustably position the line in parallelism with the upper surface of the arms. In other words, the top of the sleeve post as positioned is the datum point for the lines and the other posts adjusted so that their respective apertures align with the top of the datum post so that when the said arms are brought to a level plane the lines will likewise correspond thereto.

Positioned in each of the adjacent pairs of arms is a spirit level 33 ranging in parallelism with their respective arms, and transverse to each other, whereby when said arms are simultaneously brought to a level plane the bubble of each level will register accordingly; furthermore the glass tubes of the levels may be graduately marked for degrees each way from the center to calculate the degree of angle by movement of the bubble.

It will now be seen that when the instrument is placed in a field and the lines brought to a level the slope of the field surface is easily discerned by sighting across the lines in any desired direction as the line extends from post to post in rectangular form. To accurately record a degree of slope of the surface a conventional type of surveyor's rod may be employed for vertical reading, it being understood that the said rod is graduated its entire length with respect to feet and fractions thereof, whereby a view across the lines will intersect certain numerals and by moving the rod and seating the same on the surface the numeral reading will vary according to the slope of the surface, it being understood that the sighting must involve oppositely disposed lines or those at right angle from the line adjacent the view point as said lines are horizontally disposed when the instrument is set.

As a means to accurately and quickly check the visibility of the lines I find that by placing two lines in close proximity and sighting between the lines on each side of the head with an object in the distance there is less liability of disalignment where one line is used, as the pair of lines guide the vision more accurately. This I accomplish by placing a pair of apertures 34 spaced apart on posts 35, while the lines on the datum post are spaced apart by a washer 36, the thickness of which is equal to the space between the apertures, and securely clamped by a headed pin 37 as shown in Fig. 6, the pin being tensioned by a nut 38 threadedly engaging thereon to abut with the lower end of the sleeve.

In Figs. 10 and 11 is illustrated a modification for the spirit level 39 and in which the glass tube is arcuate in form and mounted on a base 40, the base having on each end thereof a dowel 41 as securing means for the level to the arms, each of which has a sleeve 42 positioned therein, and in which the dowels will snugly seat to position the level extending from arm to arm selectively, while leveling the arms each way, and furthermore the level thus formed and applied is means to reveal the slope of a field when the lines are rocked by the arms to correspond with the general contour of the field, it being understood that the arcuate glass tube has degree graduations marked thereon to read each way from its center or zero point that indicates a horizontal plane when the bubble registers therewith; in other words, for example, should the surface of the field slope downward toward the right as indicated in Fig. 9, and the instrument be rocked so that its confronting side lines are in parallelism with the slope, in which case the bubble will register with a selected degree at the left side of zero, and vice versa when the field and instrument slope oppositely. It will be understood that the arc of the level is on a radius from the center of ball 3, and the arms to be rocked longitudinally of the level.

In Fig. 8 is shown a plan view of the instrument with radial lines to illustrate a wide range of vision that may be had from any view point about the instrument. It will also be understood when all of the lines of the instrument are placed on a level plane, the contour of a field may be worked out by the use of a standard target rod applied in the usual manner as above described; and furthermore in the event of a great distance between the instrument and rod man the target is employed, as figure reading is impossible, in which case the rod man will record the reading as found by movement of the target, the target of the rod being adjusted to align with the plane established by sighting across the lines, whereby high points of a field are located, one purpose of which is to conserve irrigation or rain fall against free drainage by back furrowing, or forming a dam otherwise against natural drainage, and the instrument herein may be applied to other uses relating to a survey, topographical or other phase of the art, and such modifications may be made as lie within the scope of the appended claims.

Having fully described my invention, what I claim as new and desire to secure by Letters Patent is:

1. In a leveling instrument, a head and spirit levels to set the head for a selected slant, a line carried by the head in parallelism therewith, the line running rectangularly as sighting means in directions, selectively with respect to a horizontal plane or slanting position of the line, a center post vertically disposed, said post having a ball on its upper and lower ends, the head seated on the ball at the upper end of the post, means carried by the post to rock the head to a desired plane, a tripod and means secured thereto to engage the ball on the lower end of the center post adjustably, said means adapted to clamp the lower ball against rocking movement at a desired position of the post.

2. In a leveling instrument to determine configuration of the surface contour of a field, a tripod comprising a plate having ears extending downward from the plate and legs attached to the ears, and a center post having one end rockably seated in the plate, means to rigidly engage the plate to the end of the center post, a head comprised of a pair of arms transversely crossing each other, said arms being seated on the other end of the center post where the arms cross each other, a post secured near the outer extremity of each arm upwardly extending therefrom, and a line running from post to post and being connected thereto so that the line is in parallelism with the upper plane of the arms to function as sighting means for the instrument to determine the configuration of the surface of the field, means to rock the head on its respective end of the post to a horizontal plane therefrom, and spirit levels carried by the head to ascertain a horizontal position or degree of slant.

3. In a leveling instrument, of the class described, comprising a tripod having a clamp on the upper end thereof and means to open and close the clamp, a center post having one end engaged by the clamp to secure the post rigid against rocking movement, a head having radially extending arms and a plurality of radially extending bars, each bar at its longitudinal center being secured to the center post, said bars and arms of the head being in vertical alignment to impart direct tension to rock the arms, a coil spring to connect corresponding ends of the bars to corresponding ends of the head arms, tensoning means to connect the other ends of the bars to their respective arms of the head whereby the head is rocked to a desired plane or slanting therefrom, a pair of levels, one being transverse to the other and each being secured to the head to determine a level plane for the arms, a post near the outer end of each arm, upwardly extending therefrom, and a pair of lines spaced apart and carried by the posts in such a way as to position the lines in parallelism with the upper plane of the arms to function as sighting means for the instrument.

PINKNEY L. POLAND.